(12) United States Patent
Fan

(10) Patent No.: US 9,474,999 B2
(45) Date of Patent: Oct. 25, 2016

(54) BI-DIRECTIONAL REACTOR AND SUPPORTED MONOETHENALAMINE FOR $CO_2$ SEPARATION

(76) Inventor: Maohong Fan, Kent, IA (US)

( * ) Notice: Subject to any disclaimer, the term of this patent is extended or adjusted under 35 U.S.C. 154(b) by 976 days.

(21) Appl. No.: 13/469,890

(22) Filed: May 11, 2012

(65) Prior Publication Data

US 2012/0288429 A1    Nov. 15, 2012

Related U.S. Application Data

(60) Provisional application No. 61/518,855, filed on May 11, 2011.

(51) Int. Cl.
| | | |
|---|---|---|
| *B01D 53/96* | (2006.01) | |
| *B01D 53/02* | (2006.01) | |
| *B01D 53/04* | (2006.01) | |
| *B01D 53/62* | (2006.01) | |
| *B01J 20/34* | (2006.01) | |
| *B01J 20/32* | (2006.01) | |

(Continued)

(52) U.S. Cl.
CPC ............ *B01D 53/62* (2013.01); *B01D 53/025* (2013.01); *B01D 53/96* (2013.01); *B01J 20/06* (2013.01); *B01J 20/28011* (2013.01); *B01J 20/28085* (2013.01); *B01J 20/3204* (2013.01); *B01J 20/3251* (2013.01); *B01J 20/3425* (2013.01); *B01J 20/3458* (2013.01); *B01J 20/3475* (2013.01); *B01D 2251/80* (2013.01); *B01D 2252/20405* (2013.01); *B01D 2252/20426* (2013.01); *B01D 2252/20484* (2013.01); *B01D 2253/1124* (2013.01); *B01D 2253/25* (2013.01); *B01D 2257/504* (2013.01); *B01D 2258/0283* (2013.01); *B01D 2259/40083* (2013.01); *Y02C 10/04* (2013.01); *Y02C 10/08* (2013.01)

(58) Field of Classification Search
None
See application file for complete search history.

(56) References Cited

U.S. PATENT DOCUMENTS 4,273,735 A * 6/1981 Jacques et al. ............ B01J 2/08
                                                                       264/5
5,910,097 A * 6/1999 Boegner et al. ....... B01D 53/02
                                                                      60/278

(Continued)

FOREIGN PATENT DOCUMENTS

WO    WO2010/037967    *  4/2010    ............ B01D 53/14

OTHER PUBLICATIONS

"What is CSS?" IEA Greenhouse Gas R&D Programme,© 2010, printed Apr. 30, 2012, available at http://www.ieaghg.org/index.php?/20091218110/what-is-css.html, 2 pages.

(Continued)

*Primary Examiner* — Daniel Berns
(74) *Attorney, Agent, or Firm* — Aspire IP; Scott J. Hawranek

(57) ABSTRACT

The invention generally relates to a bi-directional reactor and supported amine sorbent, and more particularly to a method and system for carbon dioxide sequestration utilizing a bi-directional reactor and monoethenalamine (MEA) on a substrate. The bi-directional reactor is configured to reclaim the sorbent material as the sorbent is immobilized during the sorption phase, but is mobilized during desorption phased. The immobilized sorbent reacts with the desired contaminate to absorb and is transported to another reactor during desorption phase, thereby permitting reclamation of the sorbent.

17 Claims, 7 Drawing Sheets

(51) Int. Cl.
 B01J 20/06 (2006.01)
 B01J 20/28 (2006.01)

(56) References Cited

U.S. PATENT DOCUMENTS

2004/0244594 A1* 12/2004 Niclout et al. ..... B01D 53/0462
 96/128
2011/0293498 A1* 12/2011 Lahary et al. ..... B01D 53/1493
 423/228

OTHER PUBLICATIONS

Aboudheir et al., "Kinetics of the reactive absorption of carbon dioxide in high CO2-loaded, concentrated aqueous monoethanolamine solutions," Chemical Engineering Scienc,e 2003, 58, (23-24), pp. 5195-5210.

Abu-Zahra et al., "CO2 capture from power plants. Part I. A parametric study of the technical-performance based on monoethanolamine," International Journal of Greenhouse Gas Control, 2007, 1, (1), pp. 37-46.

Barrie et al., "WMO Greenhouse Gas Bulletin," World Meteorological Organization, Nov. 24, 2010, No. 6, pp. 1-4.

Blauwhoff et al., "A study on the reaction between CO2 and alkanolamines in aqueous-solutions," Chemical Engineering Science, 1984, 39, (2), pp. 207-225.

Chakma, "Methyl-diethanolamine degradation—Mechanism and kinetics," Canadian Journal of Chemical Engineering, 1997, 75, (5), pp. 861-871.

Cheng et al., "Optimizing preparation of the TiO2 thin film reactor using the Taguchi method," Materials & Design, 2010, 31, (4), pp. 1749-1751.

Crooks et al., "Kinetics and mechanism of the reaction between carbon-dioxide and amines in aqueous-solution," Journal of the Chemical Society-Perkin Transactions, 2, 1989, (4), pp. 331-333.

Danckwerts, "Reaction of CO2 with ethanolamines," Chemical Engineering Science, 1979, 34, (4), pp. 443-446.

Diakonov, II, "Thermodynamic properties of iron oxides and hydroxides. III. Surface and bulk thermodynamic properties of lepidocrocite (g-FeOOH) to 500 K," European Journal of Mineralogy, 1998, 10, (1), pp. 31-41.

Fan et al., "Desorption Kinetics of Monoethanolamine/Macroporous TiO2-Based CO2 Separation Process," Energy Fuels, 2011, 25, pp. 2988-2996.

Fan et al., "Supported Monothanolamine for CO2 Separation," Ind. Eng. Chem. Res., 2011, 50, pp. 11343-11349.

Feng et al., "Reduction of Energy Requirement of CO2 Desorption by Adding Acid into CO2-Loaded Solvent," Energy & Fuels, 2010, 24, pp. 213-219.

Glasscock et al., "CO2 absorption desorption in mixtures of methyldiethanolamine with monoethanolamine or diethanolamine," Chemical Engineering Science, 1991, 46, (11), pp. 2829-2845.

Hagewiesche et al., "Absorption of carbon-dioxide into aqueous blends of monoethanolamine and n-methyldiethanolamine," Chemical Engineering Science, 1995, 50, (7), pp. 1071-1079.

Han et al., "Understanding CO2 Capture Mechanisms in Aqueous Monoethanolamine via First Principles Simulations," Phys. Chem. Lett., 2011, 2, pp. 522-526.

Hoffman et al., "Factors reactor for dioxide with solid, regenerable sorbents," Proceedings of the International Technical Conference on Coal Utilization & Fuel Systems, 2008, vol. 2, pp. 1139-1150.

Khatri et al., "Carbon dioxide capture by diamine-grafted SBA-15: A combined Fourier transform infrared and mass spectrometry study," Industrial & Engineering Chemistry Research, 2005, 44, (10), pp. 3702-3708.

Kim et al., "Heat of absorption of carbon dioxide (CO2) in monoethanolamine (MEA) and 2-(Aminoethyl)ethanolamine (AEEA) solutions," Industrial & Engineering Chemistry Research, 2007, 46, (17), pp. 5803-5809.

Liao et al., "Kinetics of absorption of carbon dioxide into aqueous solutions of monoethanolamine plus N-methyldiethanolamine," Chemical Engineering Science, 2002, 57, (21), pp. 4569-4582.

Lim et al., "Carbothermal Reduction of TiO(OH)(2) in the Synthesis of (Ti,W)C," Journal of the American Ceramic Society, 2010, 93, (4), pp. 937-940.

Mandal et al., "Removal of carbon dioxide by absorption in mixed amines: modelling of absorption in aqueous MDEA/MEA and AMP/MEA solutions," Chemical Engineering Science, 2001, 56, (21-22), pp. 6217-6224.

Mathonat et al., "Use of flow calorimetry for determining enthalpies of absorption and the solubility of CO2 in aqueous monoethanolamine solutions," Industrial & Engineering Chemistry Research, 1998, vol. 37(10), pp. 4136-4141.

Palmeri et al., "Carbon dioxide absorption by MEA—A preliminary evaluation of a bubbling column reactor," Journal of Thermal Analysis and Calorimetry, 2008, 91, (1), pp. 87-91.

Park et al., "Sorption of carbon dioxide onto sodium carbonate," Separation Science and Technology, 2006, 41, (12), pp. 2665-2684.

Ramachandran et al., "Kinetics of the absorption of CO2 into mixed aqueous loaded solutions of monoethanolamine and methyldiethanolamine," Industrial & Engineering Chemistry Research, 2006, 45, (8), pp. 2608-2616.

Sjostrom et al., "Evaluation of solid sorbents as a retrofit technology for CO2 capture," Fuel, 2010, 89, (6), pp. 1298-1306.

Tanaka, "Comparison of thermal-properties and kinetics of decompositions of NAHCO3 and KHCO3," Journal of Thermal Analysis, 1987, 32, (2), pp. 521-526.

Versteeg et al., "On the kinetics between CO2 and alkanolamines both in aqueous and non-aqueous solutions. An overview," Chemical Engineering Communications, 1996, 144, pp. 113-158.

Wilska, "An X-ray diffraction study to determine the effect of the method of preparation upon the crystal structure of TiO2," Acta Chemica Scandinavica, 1954, 8, (10), pp. 1796-1801.

* cited by examiner

US 9,474,999 B2

BI-DIRECTIONAL REACTOR AND SUPPORTED MONOETHENALAMINE FOR $CO_2$ SEPARATION

This application claims the benefit of U.S. Provisional Patent Application No. 61/518,855, filed on May 11, 2011, which is hereby incorporated by reference for all purposes as if fully set forth herein.

BACKGROUND OF THE INVENTION

1. Field of the Invention

The invention generally relates to a bi-directional reactor and supported monoethenalamine (MEA), and more particularly to a method and system for carbon dioxide sequestration utilizing a bi-directional reactor and monoethenalamine (MEA) on a substrate.

2. Discussion of the Related Art

The atmospheric $CO_2$ concentration has increased by almost 38% since the beginning of the industrial revolution to a current level of about 386.8 ppm. Barrie, et al., "WMO Greenhouse Gas Bulletin," World Meteorological Organization, Nov. 24, 2010, No. 6, pp. 1-4, which is hereby incorporated by reference as if fully set forth herein. More than 30% of all anthropogenic $CO_2$ emissions are estimated to have resulted from fossil fuel based electricity generation. "What is CCS?" IEA Greenhouse Gas R&D Programme, © 2010, printed Apr. 30, 2012, from http://www.ieaghg.org/index.php?/20091218110/what-is-css.html, 2 pages, which is hereby incorporated by reference as if fully set forth herein. These fossil fuels, including coal, oil and natural gas, will be used as major energy sources for the foreseeable future due to their low prices and abundance. However, people are concerned about the increase of $CO_2$ concentration in the atmosphere since $CO_2$ has been implicated as one of the main greenhouse gases leading to global climate changes. Accordingly, capture of $CO_2$ from flue gas streams in fossil-fuel based power plants has been considered as one of the major strategies for reduction of anthropogenic $CO_2$ emissions and thus the potential risks resulting from climate changes.

To date, all commercial $CO_2$ capture processes have been based on liquid amine compounds. Amine solutions are basic and can chemically remove many acid gases, including $CO_2$, from flue gas. Danckwerts, "Reaction of $CO_2$ with ethanolamines," Chemical Engineering Science, 1979, 34, (4), pp. 443-446, which is hereby incorporated by reference as if fully set forth herein. Among the frequently used amine compounds is monoethanolamine (MEA). Aqueous amines along with membranes have been successfully used for separation of $CO_2$ from natural gas, however, they have not been used in fossil fuel based power plants since the overall costs associated with the current technologies are too high to be acceptable. The high costs are mainly due to the use of large concentrations of water in the aqueous amine solutions made for carbon dioxide separation. Typical amine solutions used by the natural gas industry for gas cleaning can contain as much as 70 wt % water. Abu-Zahra, et al., "$CO_2$ capture from power plants. Part I. A parametric study of the technical-performance based on monoethanolamine," International Journal of Greenhouse Gas Control, 2007, 1, (1), pp. 37-46; Feng, et al., "Reduction of Energy Requirement of $CO_2$ Desorption by Adding Acid into $CO_2$-Loaded Solvent," Energy & Fuels, 2010, 24, pp. 213-219, each of which is hereby incorporated by reference as if fully set forth herein.

In recent years, people are increasingly interested in using solid sorbents synthesized with amines and solid supports or grafting materials for $CO_2$ capture in power plants. Different support materials have been used for immobilization of amines. Tanaka, "Comparison of thermal-properties and kinetics of decompositions of $NAHCO_3$ and $KHCO_3$," Journal of Thermal Analysis, 1987, 32, (2), pp. 521-526; Glasscock, et al., "$CO_2$ absorption desorption in mixtures of methyldiethanolamine with monoethanolamine or diethanolamine," Chemical Engineering Science, 1991, 46, (11), pp. 2829-2845; Hagewiesche, et al., "Absorption of carbondioxide into aqueous blends of monoethanolamine and n-methyldiethanolamine," Chemical Engineering Science, 1995, 50, (7), pp. 1071-1079, each of which is hereby incorporated by reference as if fully set forth herein. Compared to aqueous amines, solid sorbents have several advantages when used for separation of $CO_2$ from flue gases in power plants. Mandal, et al., "Removal of carbon dioxide by absorption in mixed amines: modelling of absorption in aqueous MDEA/MEA and AMP/MEA solutions," Chemical Engineering Science, 2001, 56, (21-22), pp. 6217-6224; Liao, et al., "Kinetics of absorption of carbon dioxide into aqueous solutions of monoethanolamine plus N-methyldiethanolamine," Chemical Engineering Science, 2002, 57, (21), pp. 4569-4582; Ramachandran, et al., "Kinetics of the absorption of $CO_2$ into mixed aqueous loaded solutions of monoethanolamine and methyldiethanolamine," Industrial & Engineering Chemistry Research, 2006, 45, (8), pp. 2608-2616, each of which is hereby incorporated by reference as if fully set forth herein.

There is a need for an improved apparatus, process and sorbent.

SUMMARY OF THE INVENTION

Accordingly, the invention is directed to a bi-directional reactor and supported monoethanolamine for $CO_2$ sequestration that obviates one or more of the problems due to limitations and disadvantages of the related art.

An advantage of the invention is to provide a bi-directional reactor in which the sorbent material may be recycled.

Another advantage of the invention is directed away from using aqueous amines for carbon dioxide separation and using a supported amine, e.g., a supported monoethanolamine for carbon dioxide separation. Utilization of a supported amine minimizes operational energies since no energy is needed to heat and evaporate $H_2O$, with its high specific-heat-capacity and latent heat of vaporization, in aqueous amine solutions during sorbent regeneration or $CO_2$ stripping processes. In addition, supported amines are easy to handle and transport and are less problematic than aqueous amine solutions from an operational viewpoint because they are less corrosive.

Another advantage of the invention is to provide a bi-directional apparatus configured to recycle a supported amine via bi-directional operation.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

One aspect of the invention is directed towards a supported amine sorbent including a macroporous substrate and a monoethanolamine having a mass ratio to the substrate (monoethanolamine:substrate) ranging from about 40:60 to about 60:40.

Yet another aspect of the invention is directed towards a bi-directional reactor apparatus. The bi-directional reactor includes a first input, a first output, and a first reactor having a first reaction chamber which is in communication with the first reactor. The first input is coupled to the first reactor chamber. The bi-directional reactor further includes a second reactor having a second reaction chamber in communication with the first reactor. The second reactor is coupled to a second input and the first output. The first reactor is coupled to the second output. The first and second reactors include heating and cooling mechanisms as known in the art. The reactor is configured to operate bi-directionally. The first and second reaction chambers include fixed bed reactors as known in the art. Additional reactors may be added either in series or parallel to increase throughput or provide other advantages as known in the art.

Still another aspect of the invention is directed towards a method of sequestering carbon dioxide with a bi-directional apparatus. The method includes providing flue gas from a coal fired plant to the bi-directional reactor. The bi-directional reactor includes a first reactor and a second reactor and the flue gas is provided to the first reactor. Next, the method includes absorbing at least a portion of the carbon dioxide on a substrate and monoethanolamine having a mass ratio to the substrate (monoethanolamine:substrate) in a range from about 40:60 to about 60:40 in the first reactor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1A:
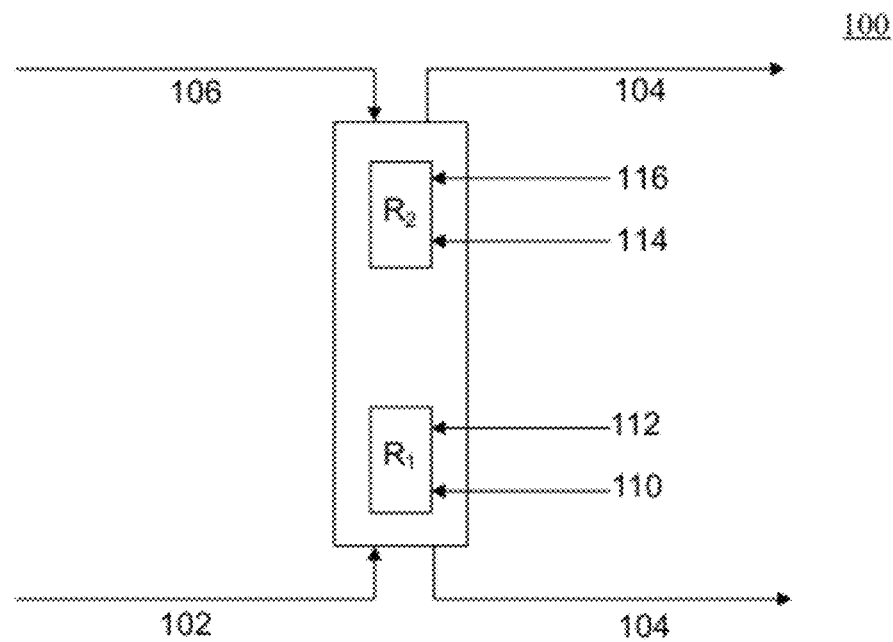
FIGS. 1A and 1B show an apparatus according to an embodiment of the invention.

Aspects of the invention are related to a bi-directional reactor, a supported amine configured to sequester a contaminate and a method of operating the same. Moreover, a pure MEA in a sorbent bed may be configured to sequester $CO_2$ in an embodiment of the invention. Moreover, the sorbent is configured to be reclaimed, such that it is immobilized during the sorption phase but mobilized during the desorption phase. The immobilized sorbent reactor with $CO_2$ in a sorption rector, but is transported to another reactor during the $CO_2$ desorption process due to the difference in sorption and desorption temperatures, thereby there are overall efficiencies in this process.

The apparatus can utilize a supported amine composition used for separating a contaminate, e.g., carbon dioxide, from an effluent. The supported amine composition is a non-aqueous sorbent or solid sorbent, which has several advantages, e.g., it requires less energy than an aqueous amine for separation of the same amount of carbon dioxide, is easy to handle and transport and is less problematic than an aqueous amine solution because it is less corrosive.

The supported amine which may used in the invention includes a substrate and a monoethanolamine having a mass ratio to the substrate (monoethanolamine:substrate) in a range from about 40:60 to about 60:40. The substrate is a supporting material for MEA, preferably, one that is inexpensive and widely available. In a preferred embodiment, the substrate has a low density in a range from about 0.3 g/cm$^3$ to about 1 g/cm$^3$ and is macroporous with an average pore size in a range from about 10 nm to about 1,000 nm, and more preferably with an average pore size in a range of about 300 nm to about 800 nm, and most preferably with average pore size in a range of about 50 nm to about 200 nm. The substrate used in the invention includes at least one of Ti, Al, Si, Fe, and combinations thereof. In a preferred embodiment, the substrate includes a macroporous material of $TiO_2$, $Al_2O_3$, $SiO_2$, FeOOH, $TiO(OH)_2$ and combinations thereof. In a preferred embodiment, the MEA has a purity in a range from about 70% to about 100%.

The invention also relates to a bi-directional reactor apparatus. The bi-directional reactor includes an input, an output, and a first reactor having a first reaction chamber in communication with the first reactor. The first input is coupled to the first reactor chamber. The bi-directional reactor further includes a second reactor having a second reaction chamber in communication with the first reactor. The second reactor is coupled to a second input and the first output. The first reactor is coupled to the second output. The first and second reactors include heating and cooling mechanisms as known in the art. The reactor is configured to operate bi-directionally. The first and second reactors are a fixed bed reactors as known in the art.

In operation, the bi-directional reactor can be run in a plurality of different operating modes: absorption (direction 1), desorption, absorption (direction 2), desorption, absorption (direction 1) and combinations thereof. Direction 1 is an opposite direction then direction 2.

The invention is also directed towards a method of sequestering carbon dioxide with a bi-directional apparatus. The method includes providing flue gas from a coal fired plant to the bi-directional reactor. The bi-directional reactor includes a first reactor and a second reactor and the flue gas is provided to the first reactor. Next, the method includes absorbing at least a portion of the carbon dioxide on a substrate and monoethanolamine having a mass ratio to the substrate (monoethanolamine:substrate) in a range from about 40:60 to about 60:40 in the first reactor.

Reference will now be made in detail to embodiments of the present invention, examples of which are illustrated in the accompanying drawings.

Figure 1B:
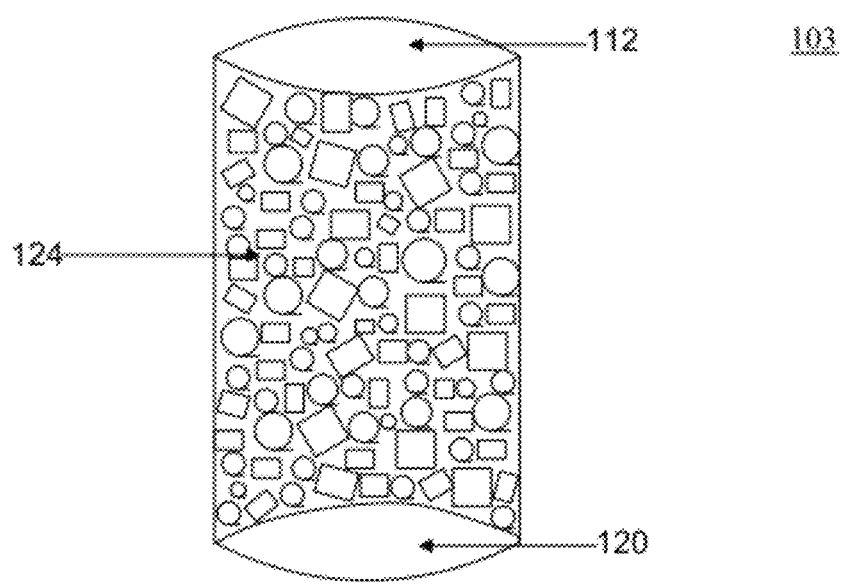

FIGS. 1A and 1B show an apparatus according to an embodiment of the invention.

Referring to FIG. 1A, the apparatus is generally depicted as reference number 100. The apparatus 100 is a bi-directional reactor apparatus configured to operate in either direction. The apparatus 100 is also configured to recycle a supported amine as described herein. The apparatus 100 includes an input 102 coupled to a first reactor chamber 103 and an output 104 coupled to a second reactor chamber 105. Moreover, an input 106 is coupled to the second reactor chamber 105 and an output 104 is coupled to the first reactor chamber 103. The heat source 110 and cooling source 112 are configured to heat and cool the first reactor chamber 103. A heat source 114 and cooling source 116 are configured to heat and cool a second reactor chamber 105. The first reactor chamber 103 may include a fixed bed reactor as known in the art. The second reactor chamber 105 may include a fixed bed reactor as known in the art. That is, the fixed bed reactor is configured to receive a sorbent bed to absorb/desorb desired constituents.

Referring to FIG. 1B, the reactor chamber 103 includes a lower support plate or screen 120 and an upper support plate or screen 122. A supported amine 124 is placed between the upper plate 122 and lower plate 120. In the reaction chamber sorption and desorption occurs. The second reactor chamber 105 is similar to the first reactor chamber 103.

In operation, the reactor 100 can be run in a plurality of different operating modes, absorption (direction 1), desorption, absorption (direction 2), desorption, absorption (direction 1) and combinations thereof. This bi-direction operation allows for reclaiming, recycling or regenerating supported sorbent material, thereby reducing the overall cost of operation and increasing overall throughput. The terms reclaiming, recycling or regenerating are used interchangeably. Each mode of operation will now be described.

In absorption (direction 1), an effluent gas stream from an inlet 102 is directed towards to the reactor chamber 103. The effluent may include any contaminated source that is configured to be sequestered with the sorbent bed, e.g., flue gas from a coal fired plant containing carbon dioxide. The reactor chambers 103 and 105 are configured as a fixed bed reactor as know in the art. In this embodiment, reactor chamber 103 includes an amine supported sorbent bed 124, e.g., MEA-$TiO_2$, and the supported sorbent bed and reactor chamber 105 includes a substrate, e.g., a macroporous material having an average pore size in a range from about 10 nm to about 1,000 nm. In a preferred embodiment, the substrate is $TiO_2$. Absorption of carbon dioxide occurs in the reactor chamber 103 until the supported sorbent is saturated.

Next desorption of carbon dioxide is performed. This can be conducted by heating the reactor chamber 103 with the heat source 110 to release carbon dioxide and MEA vapor. The desorption temperature may be controlled with a temperature controller as known in the art. The MEA vapor is condensed and reclaimed in the second reactor chamber 105. The condenser or cooler 116 is configured to a temperature to allow the MEA vapor to be condensed on the macroporous substrate, which is preloaded as the sorbent bed. The sorbent bed now includes a supported amine. The sorbent bed 124 is also now depleted of MEA, therefore, the sorbent bed 124 includes a substrate without MEA. Of course, some residual MEA may remain in the sorbent bed 124. Carbon dioxide is released via outlet 104.

Next, absorption (direction 2) is conducted. Direction 2 is an opposite direction of direction 1. That is, in direction 2 effluent gas stream from an inlet 106 is directed towards to the reactor chamber 105. The effluent may include any contaminated source that is configured to be sequestered with the sorbent bed, e.g., flue gas from a coal fired plant containing carbon dioxide. The reactor chamber 105 includes an amine supported sorbent bed, e.g., MEA-$TiO_2$, and supported sorbent bed and reactor chamber 103 includes a substrate, e.g., macroporous material having an average pore size in a range from about 10 nm to about 1,000 nm. Absorption of carbon dioxide occurs in the reactor chamber 105 until the supported sorbent is saturated.

Next desorption of carbon dioxide in reactor chamber 105 is performed. This can be conducted by heating the reactor chamber 105 with the heat source 114 to release carbon dioxide and MEA vapor. The desorption temperature may be controlled with a temperature controller as known in the art. The MEA vapor is condensed and reclaimed in the first reactor chamber 103. The condenser or cooler 112 is configured to a temperature to allow the MEA vapor to be condensed on the macroporous substrate, which is preloaded as the sorbent bed. The sorbent bed 124 now includes a supported amine. The sorbent bed in reactor chamber 105 is also now depleted of MEA, therefore, the sorbent bed includes a substrate without MEA. Of course, some residual MEA may remain in the sorbent bed 124. Carbon dioxide is released via outlet 104. Now the process cycle can be repeated. That is, absorption (direction 1) can be conducted.

This process cycle is very beneficial as it can be easily realized by using an automatic switch to change the flow direction of flue gas for cyclic $CO_2$ sorption and desorption, and it can use low-temperature waste heat to provide the energy needed for $CO_2$ desorption.

Without intending to limit the scope of the invention, the following examples and embodiments illustrate how various aspects of the invention may be made and/or used.

Example 1

$TiO_2$ Preparation and Characterization

In this example, a titanium oxide ($TiO_2$) support material was prepared with $Ti(OC_2H_5)_4$ (99 wt %, Acros) containing 33-35 wt % $TiO_2$. The first preparation step was to add a predetermined amount of $Ti(OC_2H_5)_4$ to water to obtain a $H_2O$:$Ti(OC_2H_5)_4$ molar ratio of 26.3. Next, this mixture was stirred continuously for 1 hour. The resulting precipitate was filtered, washed with deionized water, and then dried at 393 K for 1.5 hours. The $TiO_2$ support material was obtained by calcining the resultant $TiO(OH)_2$ in air at 1,023 K for 3 hours.

The $TiO_2$ support material was characterized with a Micromeritics TriStar 3000 V6.04 A nitrogen physisorption analyzer in order to determine surface areas with the Brunauer, Emmett, and Teller (BET) method. The support structure had a BET surface area of 181.6 $m^2$/g, an average pore size of 74.4 nm, and a volume of 3.3 $cm^3$/g. Powder x-ray diffraction (XRD) of the $TiO_2$ support structure was also performed with a Philips X'Pert diffractometer using Cu—Kα radiation under the following operating conditions: voltage, 40 kV; current, 40 mA; start angle, 10°; end angle, 90°; step size, 0.01°; time per step, 0.05 s; and scan speed, 0.02. The experimental data was digitally collected and recorded.

Figure 3:
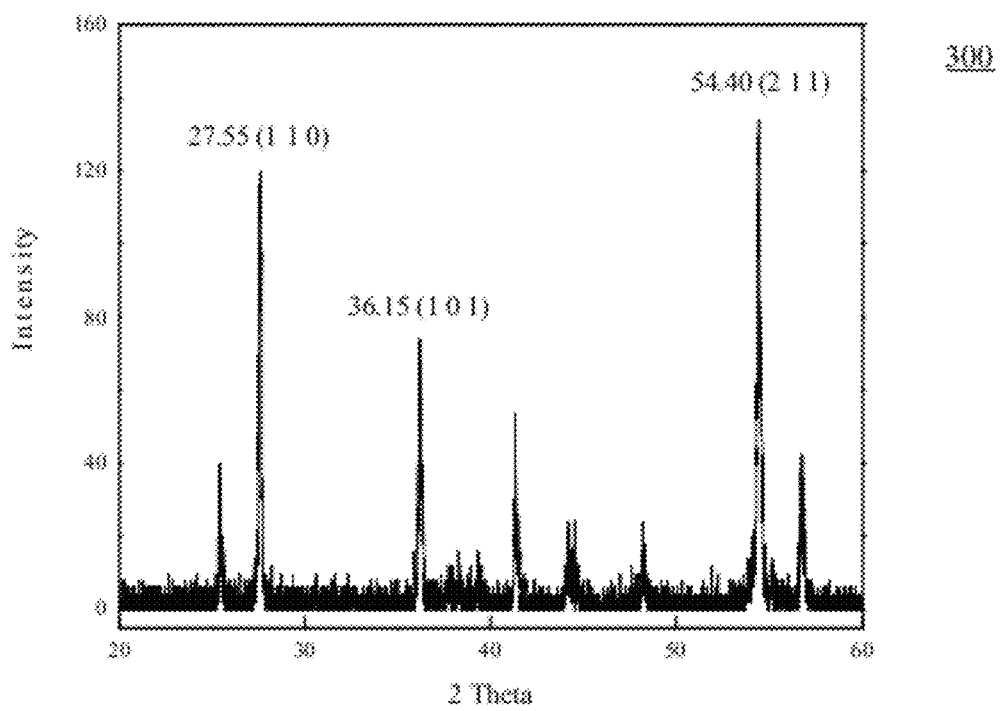
FIG. 3 shows an x-ray diffraction pattern of prepared $TiO_2$ according to an example of the invention.

FIG. 3 illustrates the X-ray diffraction pattern of the prepared TiO2 support structure from the scan. The BET surface area, pore average size and volume of the sorbent support material, $TiO_2$, are 5.68 $m^2$/g, 66.4 nm and 0.11 $cm^3$/g, respectively and $TiO(OH)_2$ corresponds to 123.2 $m^2$/g, 4 nm and 0.08 $cm^3$/g. Three major diffraction peaks appear at 2θ values of 27.5°, 36.2°, and 54.4°, corresponding to diffraction from the (110), (101), and (211) crystal planes, respectively, which is consistent with $TiO_2$ in the rutile phase. Wilska, "An X-ray diffraction study to determine the effect of the method of preparation upon the crystal structure of $TiO_2$," *Acta Chemica Scandinavica*, 1954, 8, (10), pp. 1796-1801; Cheng, et al., "Optimizing preparation of the $TiO_2$ thin film reactor using the Taguchi method," *Materials & Design*, 2010, 31, (4), pp. 1749-1751, each of which is hereby incorporated by reference as if fully set forth herein.

Example 2

Preparation of Supported Monoethanolamine

In this example, five supported monoethanolamine structures were prepared. Each MEA-$TiO_2$ (MT) structure or sorbent was prepared by loading a certain amount of as-purchased MEA (99 wt %, Acros) onto the prepared $TiO_2$ from example 1. Five MEA:$TiO_2$ mass ratios were used at 0.1, 0.25, 0.35, 0.4 and 0.45 or MEA loadings were used for preparing the MT sorbents tested for this research. The best loading of (40%) was determined and used for all subsequent tests. In addition, other materials and procedures may be utilized to prepare supported amines as described with reference to Fan, et al., "Supported Monothanolamine for $CO_2$ Separation," *Ind. Eng. Chem. Res.*, 2011, 50, pp. 11343-11349, which is hereby incorporated by reference as if fully set forth herein.

Example 3

Experimental Set-up/Apparatus

Figure 2:
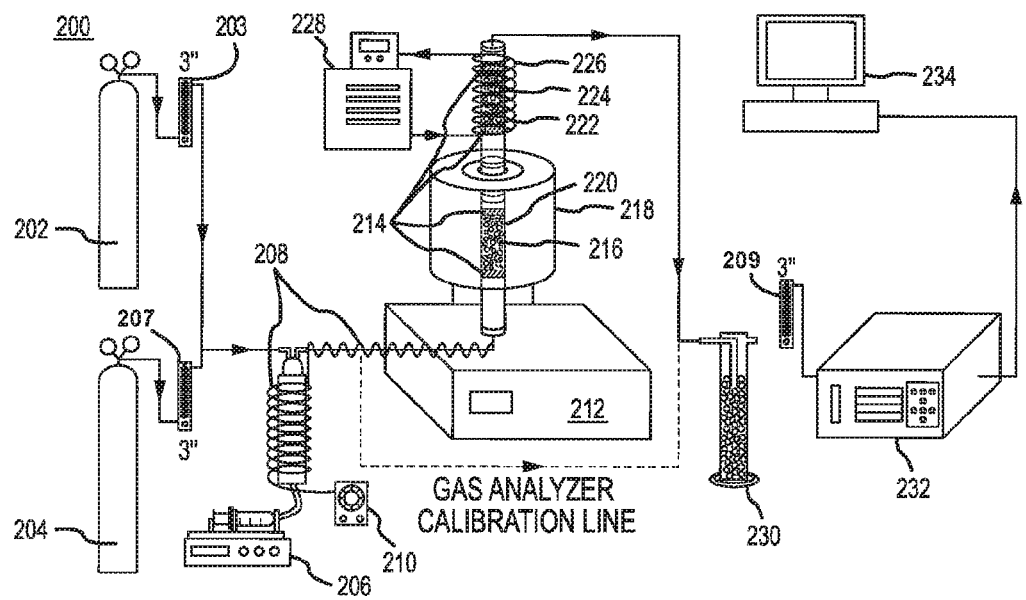
FIG. 2 shows a schematic diagram of an experimental setup according to an example of the invention.

In this example, an experimental set-up was fabricated and used for the $CO_2$ separation or sequestration. FIG. 2 shows a schematic diagram of the experimental set-up. Referring now to FIG. 2, the apparatus is generally depicted as reference number 200. The apparatus 200 generally includes three parts: a gas preparation unit, a $CO_2$ sorption/desorption system, and gas-phase $CO_2$ concentration analysis equipment. Dilute $CO_2$ from cylinder 202 (1 mol % $CO_2$ in 99 mol % $N_2$) was used for the sorption tests. $N_2$ from cylinder 204 (100 mol %) was used for $CO_2$ desorption tests and cleaning the apparatus. The flow rates of the inlet gases were controlled by two flow meters 203 and 207 (Matheson Tri-gas FM-1050). An additional flow meter 209 was used to measure the flow rate of the whole system.

Sorption tests were performed in the bottom reactor 220, which has an inner diameter and length of 9 mm and 610 mm, respectively. The sorbent bed 216 was prepared by loading the sorbent prepared in example 2 between two bed holders 214 made from quartz wool. The bottom reactor was held in a tube furnace 218, Thermo Corporation, TF55030A-1, where its temperature was controlled with a controller 212, Yokogawa M&C Corporation, UT150. A syringe pump 206 was used to generate the water vapor used in moisture-containing gas streams. Temperature controller 210, Mini-Trol, Glas-Col Inc., thermo-tapes 208 heated the inlet gas tubes to prevent condensation of water vapor prior to entering the bottom reactor.

In operation, effluent gas stream from the bottom reactor 220 passed through a sorbent bed 224. The sorbent bed 224 included a support material for MT sorbent, which was generally $TiO_2$ in the top reactor 222. The top reactor 222 was configured with a condenser 226 including a spiral copper pipe and configured to condense the MEA vaporized from the bottom reactor 220 using cooling water circulating through a spiral copper pipe. The copper pipe had an inner diameter of 1.5 mm and was held at 12° C. by a small refrigeration unit 228, MGW Lauda, RC-20 controller. The effluent gas from the top reactor 224 entered a water removal unit 230 and then an infrared gas analyzer 232, ZRE, Fuji Electric System Co. Ltd. The sorption profiles were collected by a data collection computer 234.

$CO_2$ Sorption/Desorption

Each $CO_2$ desorption test was started immediately after the bed was saturated with $CO_2$, as determined when the outlet $CO_2$ concentration during a sorption step became equal to the inlet $CO_2$ concentration. During a desorption step, pure $N_2$ from cylinder 204 was used as the carrier gas to bring the desorbed $CO_2$ from the bottom reactor 220 through the top reactor 220 and finally to the gas analyzer 232. MEA vapor resulting from the $CO_2$ desorption in the bottom reactor 220 also flowed into the top reactor 222 and condensed there. Desorption temperatures were controlled by the bottom temperature controller 212. When $CO_2$ desorption was completed, the material in the bottom reactor 220 was pure $TiO_2$ because all MEA was transported to the top reactor 222 and formed MT sorbent with the $TiO_2$ there due to the condensation of the MEA vapor from the bottom reactor 220 on the surface of pure $TiO_2$ originally in the top reactor 222. Then the positions of the top and bottom reactors were switched to start the next sorption-desorption cycle.

Figure 4:
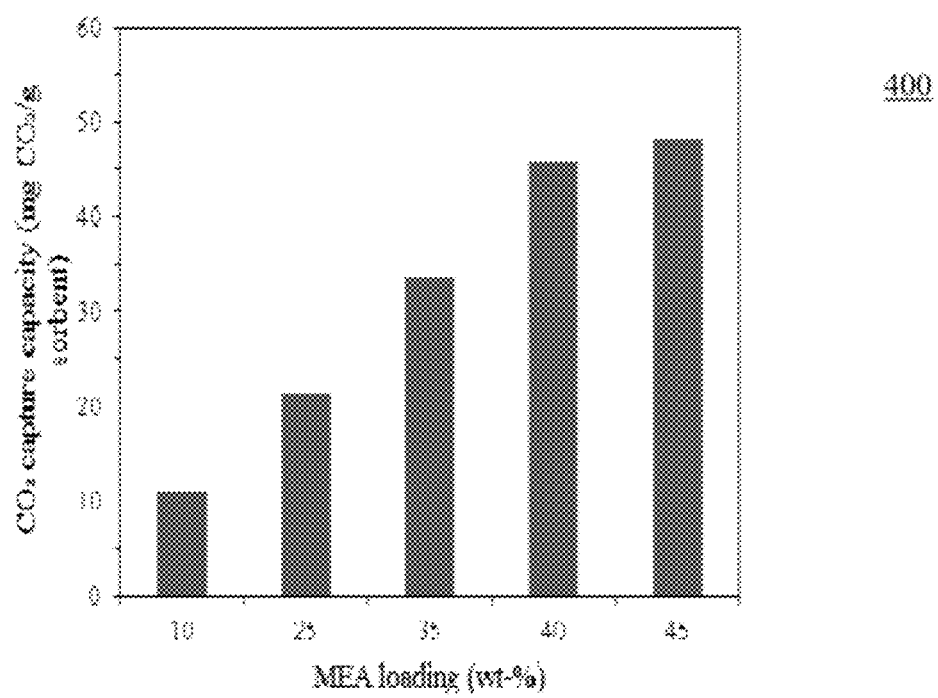
FIG. 4 shows a graphical representation of MEA on sorption capacity of MT sorbent according to an example of the invention.

FIG. 4 shows a graphical representation of MEA on sorption capacity of MT sorbent according to an example of the invention. Referring to FIG. 4, the effect of MEA loadings on sorption capacity of MT sorbent ($CO_2$: 1.0 vol %; $N_2$: 99.0 vol %; gas flow rate: 0.3 L/min; sorption temperature: 45° C.) is shown. As shown, the $CO_2$ sorption capacity of the MT sorbent increases with increases in MEA loading and reaches 48.1 mg-$CO_2$/g-MT when the MEA loading percentage is 45 wt %. The increasing trend in FIG. 4 appears to result from the reaction between $CO_2$ and pure MEA instead of an aqueous amine solution and can be understood through the following equations, E1 and E2. Park, et al., "Sorption of carbon dioxide onto sodium carbonate," *Separation Science and Technology*, 2006, 41, (12), pp. 2665-2684, which is hereby incorporated by reference as if fully set forth herein.

$$Q_g \frac{dC_{CO_2}}{d(W_{MEA,0} - w_{MEA})} - kC_{CO_2}^{n_{CO_2}} \beta_{MEA}^{m_{MEA}} = \quad (E1)$$

$$-Q_g \frac{dC_{CO_2}}{dw_{MEA}} - kC_{CO_2}^{n_{CO_2}} \beta_{MEA}^{m_{MEA}} = 0$$

$$-\frac{d\alpha_{MEA}}{dt} = k_d C_{CO_2}^{n_{CO_2}} \beta_{MEA}^{m_{MEA}} \quad (E2)$$

In equations E1 and E2, $Q_g$ is the volumetric flow rate [L/min] of the inlet gas mixture, $W_{MEA,0}$ is initial loading [g] of MEA on $TiO_2$, $C_{CO_2}$ is the concentration of $CO_2$ in the outlet gas stream at any sorption time [t, min], k is the initial $CO_2$ sorption rate constant [$m^6$/(kmol·kg·min)], $k_d$ is the deactivation rate constant [$m^3$/(kmol·min)] of pure MEA on the surface of $TiO_2$, $n_{CO_2}$ is the reaction order with respect to $CO_2$, and $m_{MEA}$ is the exponent value of $\beta_{MEA}$. In equations E1 and E2, $\beta_{MEA}$ is the activity of MEA, which ranges from 0 to 1, and can be defined by equation E3 as follows:

$$\beta_{MEA} = \frac{w_{MEA,0} - w_{MEA,t}}{w_{MEA,0}} \quad (E3)$$

where $w_{MEA,t}$ is the quantity [g] of MEA consumed at reaction time [t].

According to the zwitterion mechanism for the reaction between MEA and $CO_2$, both $n_{CO_2}$ and $m_{MEA}$ in E1 and E2 should be 1. Aboudheir, et al., "Kinetics of the reactive absorption of carbon dioxide in high $CO_2$-loaded, concentrated aqueous monoethanolamine solutions," *Chemical Engineering Science* 2003, 58, (23-24), pp. 5195-5210, which is hereby incorporated by reference as if fully set forth herein. Then, combining the integrated forms of E1 and E2 leads to equation 4 below. Park, et al., "Sorption of carbon dioxide onto sodium carbonate," *Separation Science and Technology*, 2006, 41, (12), 2665-2684, which is hereby incorporated by reference as if fully set forth herein. Equation 4 is as follows:

$$C_{CO_2} = C_{CO_2,0} \exp\{[1-\exp(kW_{MEA,0}(1-\exp(-k_d t))/Q_g)]\exp(-k_d t)\}/[1-\exp(-k_d t)] \quad (E4)$$

Equation E4 clearly shows that higher initial loading of MEA on $TiO_2$ results in lower outlet $CO_2$ concentration ($C_{CO_2}$) and thus higher $CO_2$ sorption capacity of MT. However, $C_{CO_2}$ is also affected by other parameters, such as k and $k_d$ in E1, E2 and E4. The values of k and kd are determined by various factors including the surface area, particle size, and pore structure of $TiO_2$, and the distribution of MEA on the $TiO_2$. Therefore, it is believed that the characteristics of $TiO_2$ affect its $CO_2$ sorption profiles.

MEA is well-known for its reactivity with $CO_2$, which was also observed. Typically, the MT sorbent could achieve one half of its total capacity within 10 minutes under any test conditions used. However, much longer periods of time were needed to attain the full capacity of an MT sample. The average $CO_2$ adsorption rate of the supported sorbent in the first 5 minutes was about 8 mg-$CO_2$/g-MT/min, indicating that $CO_2$ is readily able to react with MEA on the surface of the sorbent. However, MEA molecules far away from the surface of the MT sorbent (close to the surface of the support $TiO_2$ particles) or condensed in the $TiO_2$ pores are not easily accessible to $CO_2$ due to diffusion limitations. This appears to explain why the $CO_2$ sorption capacity did not improve much when MEA loading on the MT sorbent increased from 40 to 45 wt %, as observed in FIG. 4. That is, FIG. 4 clearly illustrates the effect of MEA loadings on sorption capacity of MT sorbent ($CO_2$: 1.0 vol %; $N_2$: 99.0 vol %; gas flow rate: 0.3 L/min; sorption temperature: 45° C.). Accordingly, 40 wt % MEA loading was used in other examples to evaluate the effect of other factors on $CO_2$ sorption.

Moisture

The MT sorbent was developed to overcome the shortcomings of conventional aqueous MEA-based $CO_2$ separation technologies by eliminating the use of water while maintaining its advantage of strong $CO_2$ absorption. However, the effect of water on the $CO_2$ sorption of MT has to be considered since flue gas from all combustion processes, including coal-fired power plants, contain water despite the MT sorbent being made without water. Therefore, a gas containing 0 vol % $H_2O$, 1.0 vol % $CO_2$ and 99 vol % $N_2$ and another gas with 1.0 vol % $CO_2$ and 99.0 vol % $N_2$ were compared for their $CO_2$ sorption profiles. The results are shown in FIG. 5.

Figure 5:
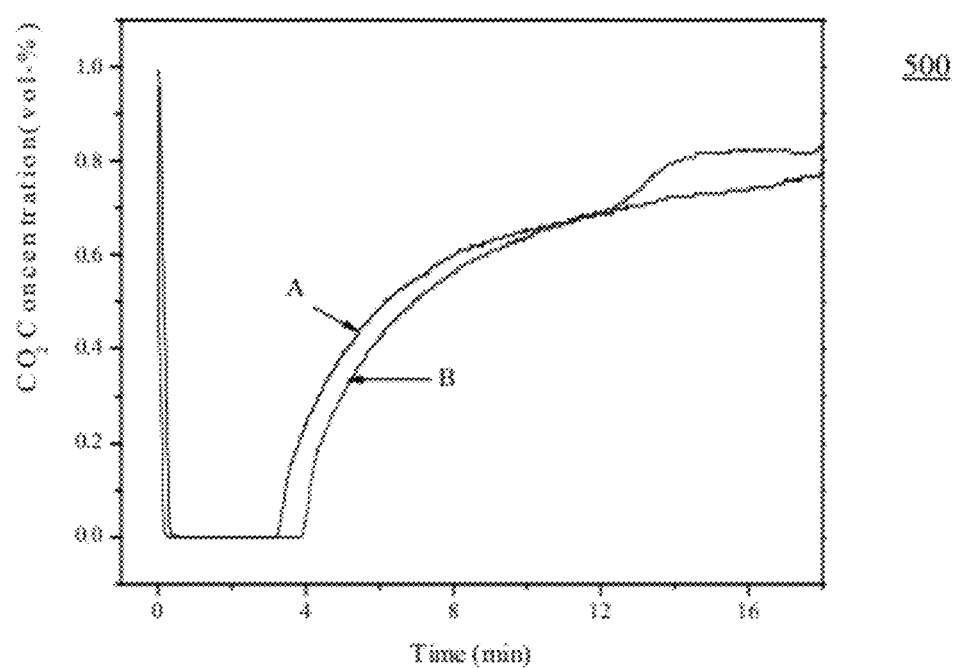
FIG. 5 shows a graphical representation of the effect of moisture and $CO_2$ concentrations according to an example of the invention.

FIG. 5 shows a graphical representation of effect of moisture and $CO_2$ concentrations according to an example of the invention [A ($H_2O$: 0 vol %; MT: 40 wt % MEA loading; $CO_2$: 1.0 vol %; $N_2$: 99 vol %; gas flow rate: 0.3 L/min; sorption temperature: 45° C.), B ($H_2O$: 1.0 vol %; MT: 40 wt % MEA loading; $CO_2$: 1.0 vol %; $N_2$: 98.0 vol %; gas flow rate: 0.3 L/min; sorption temperature: 45° C.)]. Referring to FIG. 5, it is shown that moisture has a positive effect on $CO_2$ sorption, especially in the initial $CO_2$ sorption period in which $CO_2$ outlet concentration is lower than 0.1 vol % (curve B). The performance of MT in this time period is important since it determines the breakthrough capacity of the sorbent. The $CO_2$ sorption mechanisms with and without the presence of water are expected to be different. Within a humid environment, the associated MEA-$CO_2$ reaction mechanism is based on the zwitterions theory proposed by Danckwerts and developed by others. Danckwerts, "Reaction of $CO_2$ with ethanolamines," *Chemical Engineering Science*, 1979, 34, (4), pp. 443-446; Ramachandran, et al., "Kinetics of the absorption of $CO_2$ into mixed aqueous loaded solutions of monoethanolamine and methyldiethanolamine," *Industrial & Engineering Chemistry Research*, 2006, 45, (8), pp. 2608-2616; Aboudheir, et al., "Kinetics of the reactive absorption of carbon dioxide in high $CO_2$-loaded, concentrated aqueous monoethanolamine solutions," *Chemical Engineering Science*, 2003, 58, 23-24, pp. 5195-5210; Han, et al., "Understanding $CO_2$ Capture Mechanisms in Aqueous Monoethanolamine via First Principles Simulations," *Phys. Chem. Lett.*, 2011, 2, pp. 522-526, each of which is hereby incorporated by reference as if fully set forth herein.

The MEA-$CO_2$ reaction mechanism can be written in chemical reactions shown in R1 to R14 as follows:

$$2H_2O \xrightleftharpoons{k_{R1}} OH^- + H_3O^+ \quad (R1)$$

$$CO_2 + 2H_2O \xrightleftharpoons{k_{R2}, k_{-R2}, K_{R2}} HCO_3^- + H_3O^+ \quad (R2)$$

$$HCO_3^- + H_2O \xrightleftharpoons{k_{R3}} CO_3^{2-} + H_3O^+ \quad (R3)$$

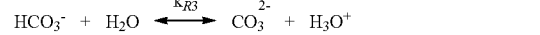

$$CO_2 + RNH_2 \xrightleftharpoons{k_{R2}, k_{-R4}, K_{R4}} RNH_2^+COO^- \quad (R4)$$

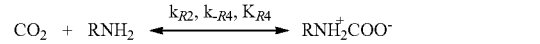

$$RNH_2^+COO^- + RNH_2 \xrightleftharpoons{k_{R5}, k_{-R5}, K_{R5}} RNH_3^+ + RNHCOO^- \quad (R5)$$

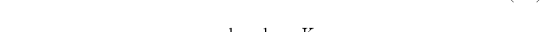

$$RNH_2^+COO^- + H_2O \xrightleftharpoons{k_{R6}, k_{-R6}, K_{R6}} H_3O^+ + RNHCOO^- \quad (R6)$$

$$RNH_2^+COO^- + OH^- \xrightleftharpoons{k_{R7}, k_{-R7}, K_{R7}} H_2O + RNHCOO^- \quad (R7)$$

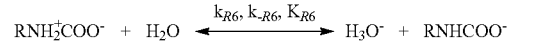

$$RNHCOO^- + H_2O \xrightleftharpoons{k_{R8}, k_{-R8}, K_{R8}} RNH_2 + HCO_3^- \quad (R8)$$

$$RNH_3^+ + H_2O \xrightleftharpoons{k_{R9}, k_{-R9}, K_{R9}} RNH_2 + H_3O^+ \quad (R9)$$

$$CO_2 + OH^- \xrightleftharpoons{k_{R10}, k_{-R10}, K_{R10}} HCO_3^- \quad (R10)$$

$$RNH_2^+COO^- + HCO_3^- \xrightleftharpoons{k_{R11}, k_{-R11}, K_{R11}} H_2CO_3 + RNHCOO^- \quad (R11)$$

-continued

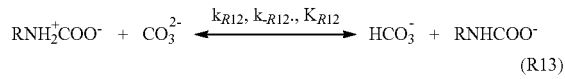
(R12)

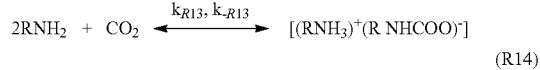
(R13)

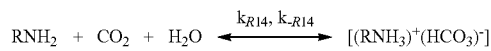
(R14)

where $k_i$, $k_{-i}$, and $K_i$ are the forward reaction rate constant, the reverse reaction rate constant, and the equilibrium constant of the reversible reactions, i, respectively. The reaction rate of $CO_2$ can be expressed as follows:

$$r_{CO_2\text{-}MEA} = \frac{[CO_2][RNH_2] - \frac{k_{-4}}{k_4}[RNHCOO^-]\frac{\sum k_{-b}[BH^+]}{\sum k_b[B]}}{\frac{1}{k_4} + \frac{k_{-4}}{k_4 \sum k_b[B]}} \quad (E5)$$

where B represents the species which can abstract the proton from the zwitterion, including [$H_2O$], and $k_b$ and $k_{-b}$ are the forward and reverse reaction rate constants of the reverse reactions involving B. Ramachandran, "Kinetics of the absorption of $CO_2$ into mixed aqueous loaded solutions of monoethanolamine and methyldiethanolamine," *Industrial & Engineering Chemistry Research*, 2006, 45, (8), pp. 2608-2616; Aboudheir, et al., "Kinetics of the reactive absorption of carbon dioxide in high $CO_2$-loaded, concentrated aqueous monoethanolamine solutions, *Chemical Engineering Science*, 2003, 58, (23-24), pp. 5195-5210; Versteeg, et al., "On the kinetics between $CO_2$ and alkanolamines both in aqueous and non-aqueous solutions. An overview," *Chemical Engineering Communications*, 1996, 144, pp. 113-158, each of which is hereby incorporated by reference as if fully set forth herein. However, according to their experimental data and derivations, many researchers proposed that the zwitterion reaction scheme based on $CO_2$ sorption rate can be written as equation E6 as follows:

$$r_{CO_2\text{-}MEA} = k_4[CO_2][RNH_2] \quad (E6)$$

where $r_{CO_2\text{-}MEA}$ is not a function of water concentration. Versteeg, et al., "On the kinetics between $CO_2$ and alkanolamines both in aqueous and non-aqueous solutions. An overview," *Chemical Engineering Communications*, 1996, 144, pp. 113-158; Blauwhoff, et al., "A study on the reaction between $CO_2$ and alkanolamines in aqueous-solutions," *Chemical Engineering Science*, 1984, 39, (2), pp. 207-225, each of which is hereby incorporated by reference as if fully set forth herein. Ramachandran concluded that equation E5 is more representative than equation E6 for the kinetics of MEA based $CO_2$ sorption within a humid environment, although they demonstrated that equation E5 needs to be modified. Aboudheir, et al., "Kinetics of the reactive absorption of carbon dioxide in high $CO_2$-loaded, concentrated aqueous monoethanolamine solutions," *Chemical Engineering Science*, 2003, 58, (23-24), pp. 5195-5210, which is hereby incorporated by reference as if fully setforth herein. The data in FIG. 5 is in accordance with their finding. The results in FIG. 5 also agree with the kinetic model of Crooks and Donnellan using a termolecular mechanism as follows:

$$r_{CO_2\text{-}MEA} = \{k_{RNH_2}[RNH_2] + k_{H_2O}[H_2O]\}[RNH_2][CO_2]\} \quad (E7)$$

in which $k_{RNH_2}$ and $k_{H_2O}$ are the corresponding rate constants with respect to $RNH_2$ and $H_2O$. Versteeg, "On the kinetics between $CO_2$ and alkanolamines both in aqueous and non-aqueous solutions. An overview," *Chemical Engineering Communications*, 1996, 144, pp. 113-158; Crooks, et al., "Kinetics and mechanism of the reaction between carbon-dioxide and amines in aqueous-solution," *Journal of the Chemical Society-Perkin Transactions*, 2, 1989, (4), pp. 331-333, each of which is hereby incorporated by reference as if fully set forth herein.

Furthermore, the degree to which water concentration affects $r_{CO_2\text{-}MEA}$ may need to be reconsidered. According to equation E7 the $CO_2$-MEA reaction is first order with respect to both $H_2O$ and $CO_2$. However, the data in FIG. 5 does not support this conclusion since water did not show such a large positive effect. Actually, the effect decreases, disappears and finally becomes slightly negative as the sorption process proceeds. Therefore, the kinetics associated with the reactions in dry and wet environments may need further polishing.

Sorption Temperature

Figure 6A:
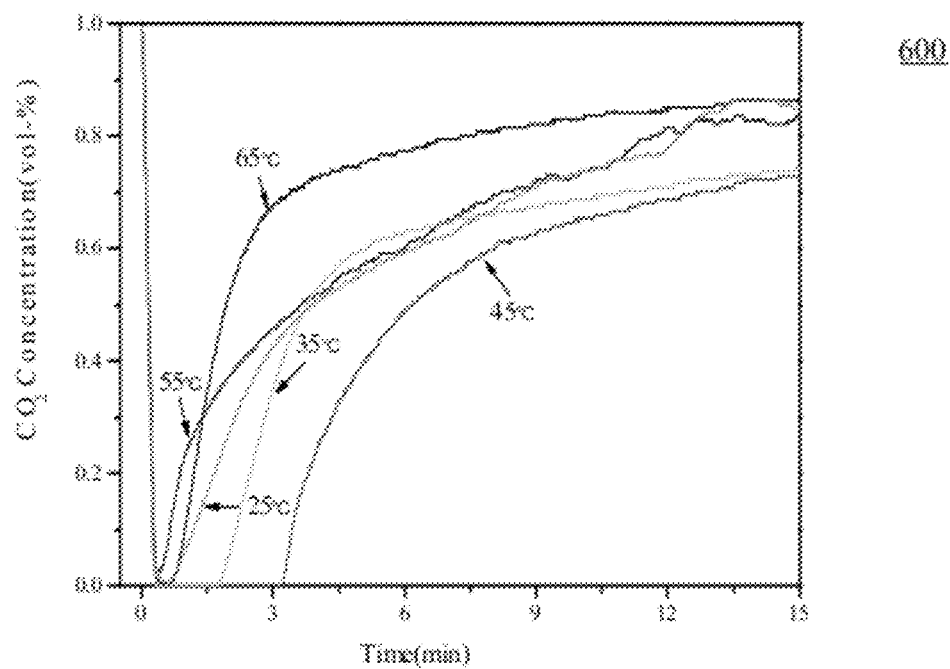
FIGS. 6A and 6B show a graphical representation of the effect of temperature on $CO_2$ sorption profile (FIG. 6A) and capacity (FIG. 6B) according to an example of the invention.
Figure 6B:
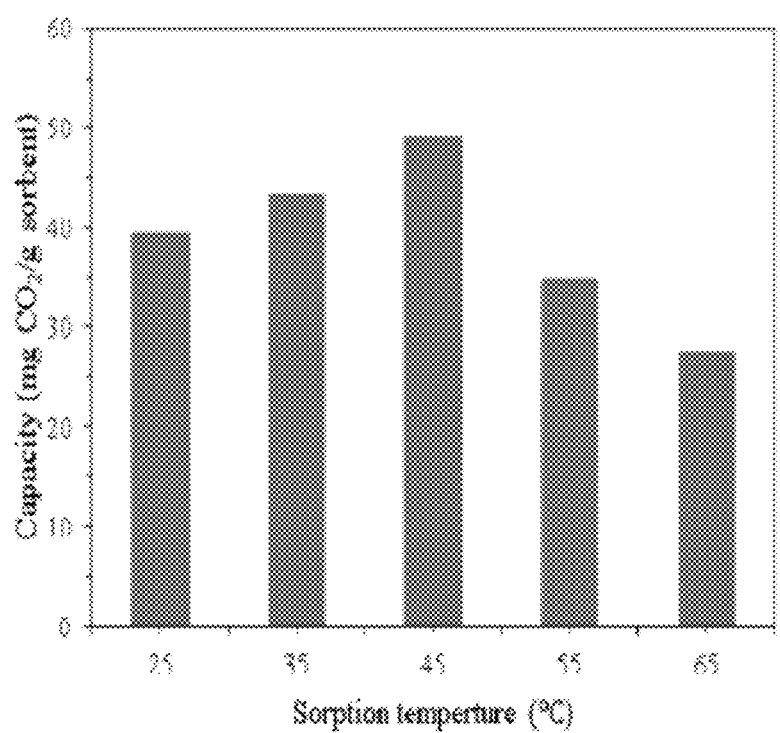

FIGS. 6A and 6B show a graphical representation of the effect of temperature on $CO_2$ sorption profile (FIG. 6A) and capacity (FIG. 6B) according to an example of the invention. More specifically, FIGS. 6A and 6B illustrate the effect of temperature on the $CO_2$ sorption profile (A) and capacity (B) (MT: 40 wt-% MEA loading; $CO_2$: 1.0 vol %; $N_2$: 99.0 vol %; gas flow rate: 0.3 L/min; sorption temperature: 45° C.). Effects of sorption temperature on the total $CO_2$ sorption capacity of MT sorbents were evaluated in the temperature range of about 25° C. to about 65° C. Referring to FIGS. 6A-6B, it is shown that the $CO_2$ sorption capacity increases with temperature in the range of about 25° C. to about 45° C., but decreases with the further increases of temperature from about 45° C. to 65° C.

The relationship between temperature and $CO_2$ sorption capacity can be understood from the thermodynamic and kinetic characteristics of R13. R13 is an exothermic reaction or its enthalpy change ($\Delta H_{R13} < 0$) is negative under the experimental conditions. Palmeri, et al., "Carbon dioxide absorption by MEA—A preliminary evaluation of a bubbling column reactor," *Journal of Thermal Analysis and Calorimetry*, 2008, 91, (1), pp. 87-91; Kim, et al., "Heat of absorption of carbon dioxide ($CO_2$) in monoethanolamine (MEA) and 2-(Aminoethyl)ethanolamine (AEEA) solutions," *Industrial & Engineering Chemistry Research*, 2007, 46, (17), pp. 5803-5809, each of which is hereby incorporated by reference as if fully set forth herein.

Based on the van't Hoff relationship, temperature increases do not favor R13 since equilibrium $CO_2$ sorption capacity (determined by $K_{R13}$ and associated with $K_{R4}$ and $K_{R5}$) decreases due to the negative $\Delta H_{R13}$.

$$\frac{d \ln K_{R13}}{dT} = \frac{d \ln K_{R4} K_{R5}}{dT} \quad (E8)$$
$$= \frac{\Delta H_{R13}}{RT^2}.$$

The van't Hoff relationship is described in Smith, et al., "Introduction to Chemical Engineering Thermodynamics," 6 ed., McGraw Hill, 2001. Two methods can be used for calculation of $K_{R13}$ for MT-based $CO_2$ sorption in a dry environment at a given temperature, T. The first is based on the thermodynamic properties of MEA, $CO_2$, [$(RNH_3)^+(RNHCOO)^-$] in R13 using:

$$\Delta G_{R13}^{\circ} = -RT\ln K_{R13} \tag{E9}$$

$$= \Delta H_{0,R13}^{\circ} - \frac{T}{T_0}(\Delta H_{0,R13}^{\circ} - \Delta G_{0,R13}^{\circ}) +$$

$$\Delta C_P^{\circ}(T - T_0) - T\Delta C_P^{\circ}\ln\frac{T}{T_0}$$

where $T_0$ is reference temperature, $\Delta H_0^{\circ}$ and $\Delta G_0^{\circ}$ are the standard enthalpy and free Gibbs energy changes of R13 at the reference temperature, and $$\Delta C_P^{\circ} = C_{P,[(RNH3)+(R\ NHCOO)-]}^{\circ} - 2C_{P,RNH_2}^{\circ} - C_{P,CO_2}^{\circ} \tag{E10}$$

where $C_{P,[(RNH3)+(R\ NHCOO)-]}^{\circ}$, $C_{P,RNH_2}^{\circ}$ and $C_{P,CO_2}^{\circ}$ represent the heat capacities of the three reactants and products at constant pressure. The second method is to combine E8 with the following relationship $$K_{R13} = K_{R4}K_{R5} \tag{E11}$$

$$= \frac{k_{R4}}{k_{-R4}}\frac{k_{R5}}{k_{-R5}}$$

where $k_{R4}$, $k_{-R4}$, $k_{R5}$ and $k_{-R5}$ are the forward and reverse rate constants of reactions R4 and R5, respectively. The forward reaction rate constants, $k_{R4}$ and $k_{R5}$, increase with T according to the Arrhenius equation while $K_{R13}$ in E8 and E11 decreases with T. Fogler, "*Elements of Chemical Reaction Engineering,*" 4 ed., Prentice Hall, PTR: 2006, which is hereby incorporated by reference as if fully set forth herein. Therefore, an optimal $CO_2$ sorption temperature exists that is a compromise between these kinetic and thermodynamic factors to obtain a reasonably high rate of R13 and yet large $CO_2$ sorption. In other words, the optimal sorption temperature for the MT based $CO_2$ sorption technology is defined as that which maximizes the $CO_2$ sorption capacity within a given reaction time period. The optimal temperature at which the maximum total $CO_2$ adsorption capacity was achieved under the given experimental conditions is 45° C.

Desorption Temperature $CO_2$ desorption tests were performed at 80° C., 90° C., 100° C. and 110° C. to evaluate the effect of temperature on $CO_2$ sorption capacity of the MT sorbent regenerated for next cycle of sorption and desorption. The results are shown in FIG. 7.

Figure 7:
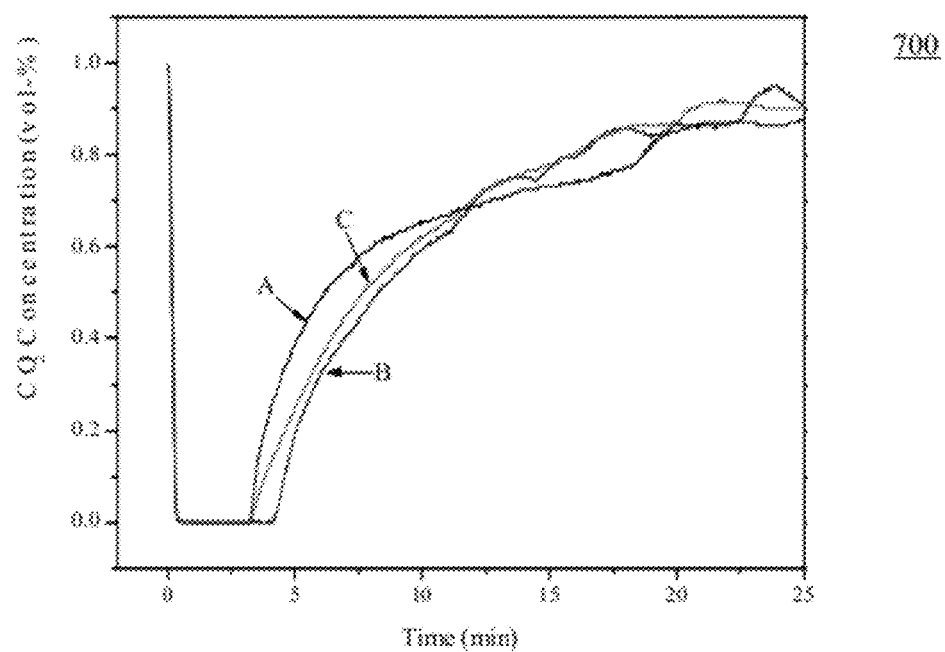
FIG. 7 shows a graphical representation of the effect of desorption temperatures according to an example of the invention.

FIG. 7 illustrates the effect of desorption temperature (MT: 40 wt % MEA loading; $CO_2$: 1.0 vol %; $N_2$: 99 vol %; gas flow rate: 0.3 L/min; sorption temperature: 45° C.). The intermediate temperatures, 90° C. and 100° C., are better based on the sorption capacities obtained in the next sorption-desorption cycle. However, due to the higher energy consumption at 100° C., 90° C. was chosen as the $CO_2$ desorption temperature for all other MT evaluation tests. Moreover, desorption kinetics of MT are further described with reference to Fan, et al., "Desorption Kinetics of Monoethanolamine/Macroporous TiO2-Based $CO_2$ Separation Process," *Energy Fuels*, 2011, 25, pp. 2988-2996, which is hereby incorporated by reference as if fully set forth herein.

Alternative Support Materials for MEA

An alternative Ti based support material is $TiO(OH)_2$, which can be easily prepared at low temperatures compared to $TiO_2$. It is stable even at 400° C. Lim, et al., "Carbothermal Reduction of TiO(OH)(2) in the Synthesis of (Ti,W) C," *Journal of the American Ceramic Society*, 2010, 93, (4), pp. 937-940. Its performance as a support for MEA is better than $TiO_2$ to some degree during most of the sorption period, as shown in the $CO_2$ breakthrough curves in FIG. 8. This might be explained with the kinetic model obtained by Ramachandran. Aboudheir, et al., "Kinetics of the reactive absorption of carbon dioxide in high CO2-loaded, concentrated aqueous monoethanolamine solutions," *Chemical Engineering Science*, 2003, 58, (23-24), pp. 5195-5210, which is hereby incorporated by reference as if fully set forth herein.

They found that the $OH^-$ increases the reaction rate between MEA and $CO_2$. Therefore, $TiO(OH)_2$ can probably accelerate $CO_2$ sorption to some degree due to the $OH^-$ in its structure. Among many other possible highly porous and inexpensive MEA support materials is FeOOH. FeOOH starts to dehydrate at 213° C. or 490 K. Diakonov, II, "Thermodynamic properties of iron oxides and hydroxides. III. Surface and bulk thermodynamic properties of lepidocrocite (γ-FeOOH) to 500 K," *European Journal of Mineralogy*, 1998, 10, (1), pp. 31-41, which is hereby incorporated by reference as if fully set forth herein. Therefore, it is thermally stable under the operation conditions used in this research. It also has $OH^-$ in its structure and is less expensive than $TiO_2$ and $TiO(OH)_2$.

Figure 8:
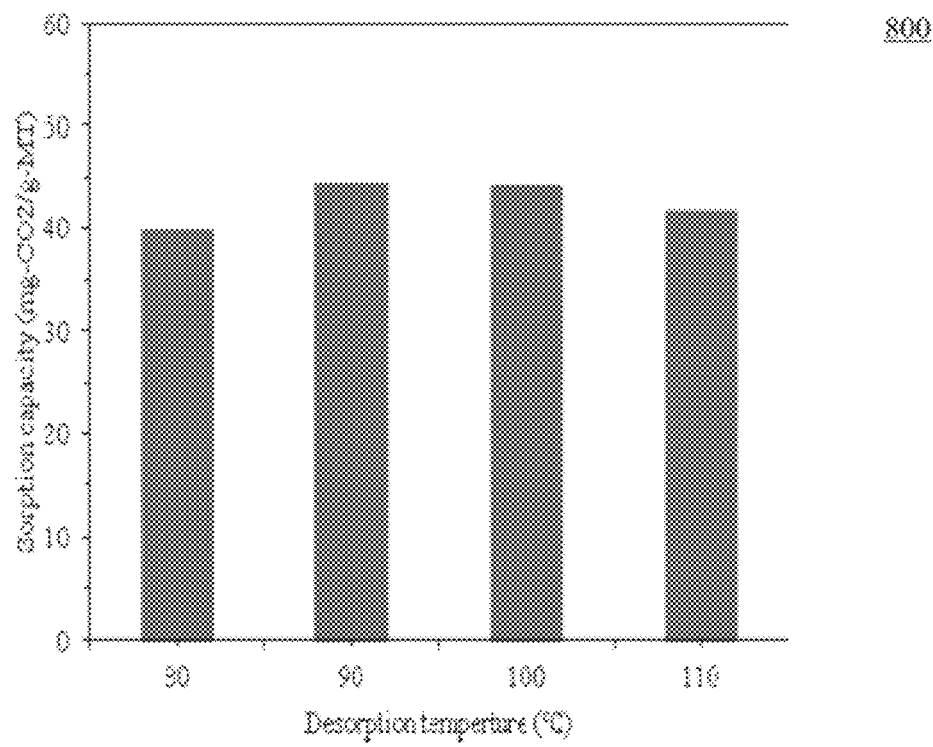
FIG. 8 shows a graphical comparison of different support materials and their effects on $CO_2$ sorption according to an example of the invention.

FIG. 8 shows a comparison of different support materials (A: $TiO_2$; B: $TiO(OH)_2$; C: FeOOH) for their effects on $CO_2$ sorption (MEA loading in each sorbent: 40 wt %; $CO_2$: 1.0 vol %; $N_2$: 99.0 vol %; gas flow rate: 0.3 L/min; sorption temperature: 45° C.). The sorption results with the pure MEA supported with FeOOH is also shown in FIG. 8. FeOOH is better than $TiO_2$, but not as good as $TiO(OH)_2$. When choosing support materials for MEA, other factors such as acidic components in the flue gas, cost and availability should also be considered. For example, acidic compounds in the flue gas, $SO_x$ and $NO_x$, may affect the life spans of the support materials due to their potential reactions with the acidic compounds. Ti based compounds are better than FeOOH from the perspective of their corrosion-resistance abilities.

Sorbent Regeneration/Reclaiming

Industrial chemisorbents are required not only to be highly active and selective, but also regenerable. Therefore, five-cycle $CO_2$ sorption-desorption tests with MT sorbents were run under conditions with and without moisture. The results are presented in FIGS. 9A and 9B, disclosing $CO_2$ sorption capacities of MT during five sorption-desorption cycles [FIG. 9A (sorption gas: $CO_2$: 1.0 vol %; $N_2$: 99 vol %), FIG. 9B (sorption gas: $H_2O$: 1.0 vol %; $CO_2$: 1.0 vol %; $N_2$: 98 vol %), sorption (MT: 40 wt % MEA loading; gas flow rate: 0.3 L/min; sorption temperature: 45° C.), desorption ($N_2$: 100 vol %; gas flow rate: 0.3 L/min; sorption temperature: 90° C.)]. The average adsorption capacities for five-cycle tests at 45° C. under dry and humid (1 vol % $H_2O$) sorption conditions are 45.8 and 48.1 mg-$CO_2$/g-MT, respectively, indicating that MT can be used in both dry and wet environments for effective $CO_2$ separation.

The capacities of MT under the two different environments are higher than that of aqueous MEA, which can absorb 36 mg-$CO_2$/g-aqueous-MEA. Chakma, "Methyldiethanolamine degradation—Mechanism and kinetics," *Canadian Journal of Chemical Engineering*, 1997, 75, (5), pp. 861-871, which is hereby incorporated by reference. In addition, they are also higher than the $CO_2$ sorption capacities of 21 sorbents among 24 evaluated by Sjostrom and Krutka in 2010. Khatri, et al., "Carbon dioxide capture by diamine-grafted SBA-15: A combined Fourier transform infrared and mass spectrometry study," *Industrial & Engineering Chemistry Research*, 2005, 44, (10), pp. 3702-3708;

Sjostrom, et al., "Evaluation of solid sorbents as a retrofit technology for CO2 capture," *Fuel,* 2010, 89, (6), pp. 1298-1306, each of which is hereby incorporated by reference as if fully set forth herein. Most of those 24 sorbents tested by Sjostrom, et al., contain 40-50 wt % amines, which is equal to or higher than the MEA percentage (40 wt %) of the MT sorbent used in this research.

Figure 9A:
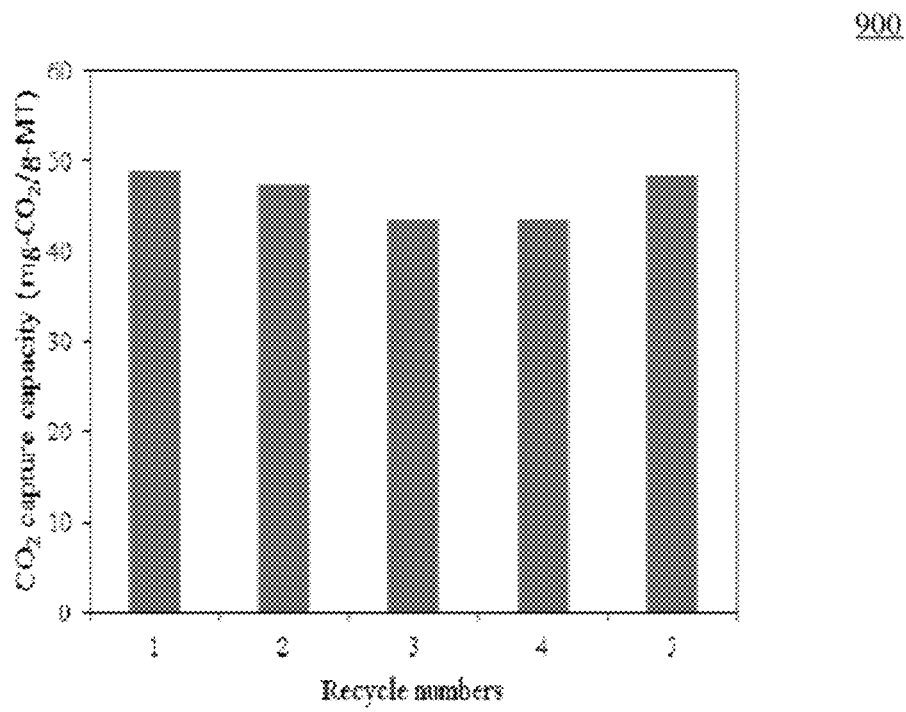
FIGS. 9A and 9B show a graphical representation of the $CO_2$ sorption capacities of MT during five sorption-desorption cycles according to an example of the invention.
Figure 9B:
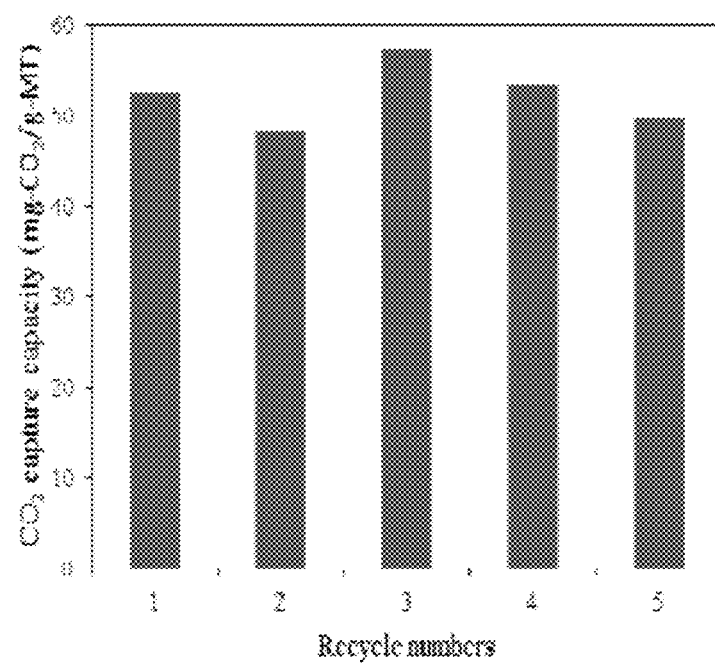

The regeneration temperatures of those sorbents varied from 80° C. to 120° C. and increased by 10° C. with each subsequent sorption-desorption cycle compared to the constant 90° C. used for the spent MT regeneration. The quantities of $CO_2$ immobilized on MT during the sorption period and $CO_2$ desorbed from spent MT during the desorption process, determined by integrating $CO_2$ concentration change profiles in each sorption-desorption cycle, are very close. In other words, the working capacity, as defined by Sjostrom and Krutka, is almost equal to the sorption capacity for the MT sorbent. Sjostrom, et al., "Evaluation of solid sorbents as a retrofit technology for $CO_2$ capture," *Fuel,* 2010, 89, (6), pp. 1298-1306, which is hereby incorporated by reference as if fully set forth herein. This is the reason that the $CO_2$ sorption capacities do not fluctuate considerably from one sorption-desorption cycle to another, as shown in FIGS. 9A and 9B.

The amount of energy needed for regeneration of a spent sorbent is an important consideration in its applicability, and can be evaluated by the following equation (E11):

$$\frac{Q}{m_c} = \frac{m_e}{m_c} \cdot C_e \cdot \Delta T + \frac{B}{L} \cdot C_s \cdot \Delta T + C_{p \cdot c} \cdot T_2 - C_s \cdot T_1 + \frac{Q_r}{m_c}$$

in this equation 1 and 2 stand for the $CO_2$ sorption and regeneration states, respectively; the subscripts, e, s, and c respectively represent the equipment, the sorbent, and the $CO_2$; m is the mass, C is the specific heat [kJ/(kg·K)]; $C_p$ is the constant pressure heat capacity for $CO_2$; Q is the heat input [kJ]; $Q_r$ is the heat of reaction [kJ/kg]; B is a constant of proportionality with dimensional units, and L is the $CO_2$ loading capacity, defined as mole-$CO_2$/kg sorbent. Sjostrom, et al., "Evaluation of solid sorbents as a retrofit technology for CO2 capture," *Fuel,* 2010, 89, (6), pp. 1298-1306; Hoffman, et al., "Factors reactor for dioxide with solid, regenerable sorbents," *Proceedings of the International Technical Conference on Coal Utilization & Fuel Systems,* 2008; Vol. 2, pp 1139-1150, each of which is hereby incorporated by reference as if fully set forth herein. To reduce energy consumption needed for MT sorbent regeneration, more effort needs to be made to increase L, which can be realized by exploring better support materials and optimizing $CO_2$ sorption conditions.

The MT sorbent can be prepared using a simple method in an environmentally benign manner since no additional chemicals, such as organic solvents, are needed. The equipment requirements for separation of $CO_2$ with the MT based technology should not be as demanding as those associated with the majority of other $CO_2$ separation technologies since the spent sorbent regeneration temperature is 90° C., lower or much lower than those needed for other technologies. Sjostrom, "Evaluation of solid sorbents as a retrofit technology for $CO_2$ capture," *Fuel,* 2010, 89, (6), pp. 1298-1306, which is hereby incorporated by reference as if fully set forth herein. Moreover, this system allows for no external addition of water to the sorption system. Therefore, the capital equipment investment needed for the MT based $CO_2$ separation technology should be low.

Operational costs account for the majority of the overall $CO_2$ separation costs in all $CO_2$ capture technologies, with $CO_2$ desorption typically being the most expensive step. Avoidance of use of water and the reduction of the $CO_2$ desorption temperature is thought to contribute significantly to the total cost reduction of $CO_2$ separation.

The mechanism of the positive effect of OH— on CO2 sorption capacity needs to be further understood. In addition, studies on the thermodynamics and kinetics of R13 are still lacking, even though those of R14 are well-researched and many progresses have been made. R13 and R14 have different reactants and products. Therefore, the thermodynamic and kinetic study results reported in the literature for R14 can not be used for R13. Moreover, even for R14, some disagreements exist among the published papers regarding its thermodynamic and kinetic properties under the same $CO_2$ sorption conditions. For example, the enthalpy change of R14 during $CO_2$ sorption at 320 K is reported by Palmeri, et al., as ~57 kJ/mole-$CO_2$, while Mathonat, et al., report the value as ~80 kJ/mole-$CO_2$.

The inventions and methods described herein can be viewed as a whole, or as a number of separate inventions that can be used independently or mixed and matched as desired. All inventions, steps, processes, devices, and methods described herein can be mixed and matched as desired. All previously described features, functions, or inventions described herein or by reference may be mixed and matched as desired.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. The method of sequestering carbon dioxide with a bi-directional reactor, comprising the steps of:
   providing a flue gas from a coal fired plant to the bi-directional reactor, wherein the bi-directional reactor comprises a first reactor and a second reactor and wherein the flue gas is provided to the first reactor;
   absorbing at least a portion of the carbon dioxide in a sorbent bed of the first reactor, wherein the sorbent bed comprises a first substrate and monoethanolamine having a mass ratio to the first substrate (monoethanolamine:substrate) in a range from about 40:60 to about 60:40; and
   reclaiming the monoethanolamine with the second reactor comprising the steps of:
   heating the first reactor to a temperature configured to release monoethanolamine vapor and the at least a portion of the absorbed carbon dioxide in the first reactor;
   condensing the monoethanolamine vapor in the second reactor; and
   capturing the monoethanolamine on a second substrate in the second reactor.

2. The method of claim 1, wherein the first substrate and the second substrate comprise at least one of $TiO_2$, $Al_2O_3$, $SiO_2$, FeOOH and $TiO(OH)_2$.

3. The method of claim 2, wherein the monoethanolamine comprises a purity in a range from about 70% to about 100%.

4. The method of claim 1, wherein the first substrate comprises $TiO_2$ and wherein the mass ratio (monoethanolamine:substrate) is about 40:60.

5. The method of claim 1, further comprising the steps of:
providing the flue gas to the second reactor; and
absorbing at least a portion of the carbon dioxide in the second reactor.

6. The method of claim 5, further comprising reclaiming the monoethanolamine with the first reactor, comprising the steps of:
heating the second reactor to a temperature configured to release monoethanolamine vapor and the absorbed carbon dioxide in the second reactor;
condensing the monoethanolamine vapor in the first reactor; and
capturing the monoethanolamine on the substrate in the first reactor.

7. The method of sequestering carbon dioxide with a bi-directional reactor, comprising the steps of:
providing a gas comprising carbon dioxide to the bi-directional reactor comprising a first reactor comprising a sorbent bed and a second reactor, wherein the gas is provided to the first reactor;
absorbing at least a portion of the carbon dioxide in the sorbent bed of the first reactor, wherein the sorbent bed comprises a first substrate and monoethanolamine having a mass ratio to the first substrate (monoethanolamine:substrate) in a range from about 40:60 to about 60:40; and
reclaiming the monoethanolamine with the second reactor, comprising the steps of:
heating the first reactor to a temperature configured to release monoethanolamine vapor and the at least a portion of the absorbed carbon dioxide in the first reactor;
condensing the monoethanolamine vapor in the second reactor; and
capturing the monoethanolamine on a second substrate in the second reactor.

8. The method of claim 7, wherein at least one of the first or second substrate comprises a macroporous material.

9. The method of claim 8, wherein the macroporous material comprises an average pore size in a range from about 10 nm to about 1,000 nm.

10. The method of claim 8, wherein the macroporous material comprises a low density in a range from about 0.3 g/cm$^3$ to about 1 g/cm$^3$.

11. The method of claim 8, wherein the macroporous material comprises at least one of $TiO_2$, $Al_2O_3$, $SiO_2$, FeOOH and $TiO(OH)_2$.

12. The method of claim 7, wherein the monoethanolamine comprises a purity in a range from about 70% to about 100%.

13. The method of sequestering carbon dioxide from a flue gas with a bi-directional reactor, comprising the steps of:
providing the flue gas from a coal fired plant to the bi-directional reactor, wherein the bi-directional reactor comprises a first reactor and a second reactor in fluid communication with each other and wherein the flue gas is provided to the first reactor; and
absorbing at least a portion of the carbon dioxide in a first sorbent bed of the first reactor, wherein the first sorbent bed comprises a supported amine sorbent; and
reclaiming at least a portion of the amine sorbent with the second reactor, comprising the steps of:
heating the first reactor to a temperature configured to release amine sorbent vapor and the at least a portion of the absorbed carbon dioxide in the first reactor;
condensing the amine sorbent vapor in the second reactor; and
capturing the amine sorbent vapor on a second substrate in the second reactor.

14. The method of claim 13, wherein the supported amine sorbent comprises monoethanolamine.

15. The method of claim 13, wherein the second reactor comprises a sorbent bed comprising a supported amine sorbent.

16. The method of claim 15, wherein the first reactor supported amine sorbent and the second reactor supported amine sorbent each comprise a macroporous material having an average pore size in a range from about 10 nm to about 1,000 nm and each comprise at least one of $TiO_2$, $Al_2O_3$, $SiO_2$, FeOOH and $TiO(OH)_2$.

17. The method of claim 16, wherein the macroporous material comprises a low density in a range from about 0.3 g/cm$^3$ to about 1 g/cm$^3$.

* * * * *